Oct. 2, 1951     C. B. HOBBS     2,570,126
POPCORN POPPING DEVICE

Filed April 5, 1948     3 Sheets-Sheet 1

INVENTOR.
Charles B. Hobbs
BY
Kenyon & Kenyon
ATTORNEYS

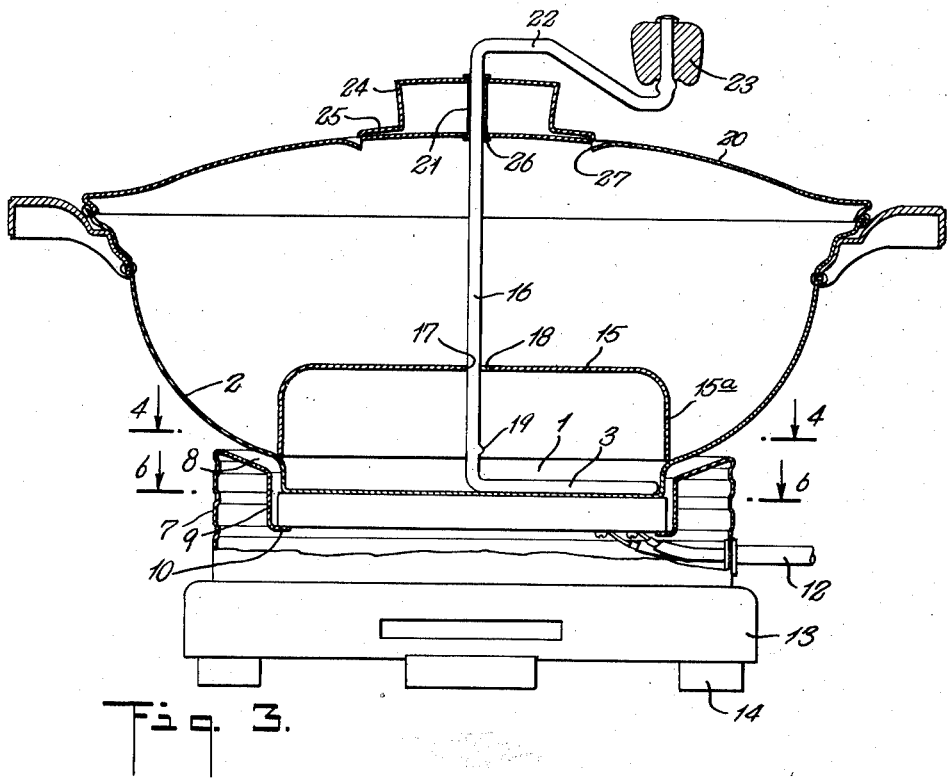

Oct. 2, 1951 — C. B. HOBBS — 2,570,126
POPCORN POPPING DEVICE
Filed April 5, 1948 — 3 Sheets-Sheet 3

INVENTOR.
Charles B. Hobbs
BY Kenyon & Kenyon
ATTORNEYS

Patented Oct. 2, 1951

2,570,126

UNITED STATES PATENT OFFICE 2,570,126

POPCORN POPPING DEVICE

Charles B. Hobbs, Decatur, Ill., assignor to U. S. Manufacturing Corporation, Decatur, Ill., a corporation of Illinois Application April 5, 1948, Serial No. 18,979

4 Claims. (Cl. 99—238.1)

This invention relates to popcorn popping devices of the general type including a pot provided with a lid and stirrer and a stove for heating the bottom of the pot.

In this type of device the popcorn is placed in the pot and covered by the lid, and the pot is heated by the stove to pop the popcorn while the stirrer is turned for the purpose of preventing the popcorn from scorching.

Heretofore this type of this device has had the objectionable feature of scorching the popped popcorn during efforts to pop all the unpopped popcorn. Some of the kernels require longer heating to pop them than do others, and with the unpopped popcorn mixed with the popped popcorn the latter is sometimes scorched during the prolonged heating of the unpopped kernels required to pop them.

With the above in mind, an object of the present invention is to provide a device which will permit such prolonged heating of the unpopped kernels without scorching the popped popcorn. Other objects may be inferred from the following disclosure.

Figure 1:
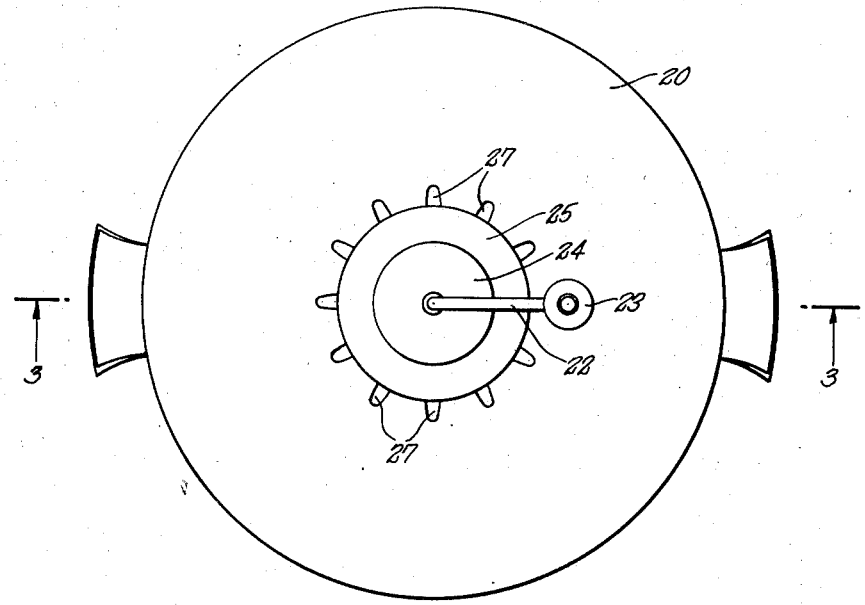
Figure 2:
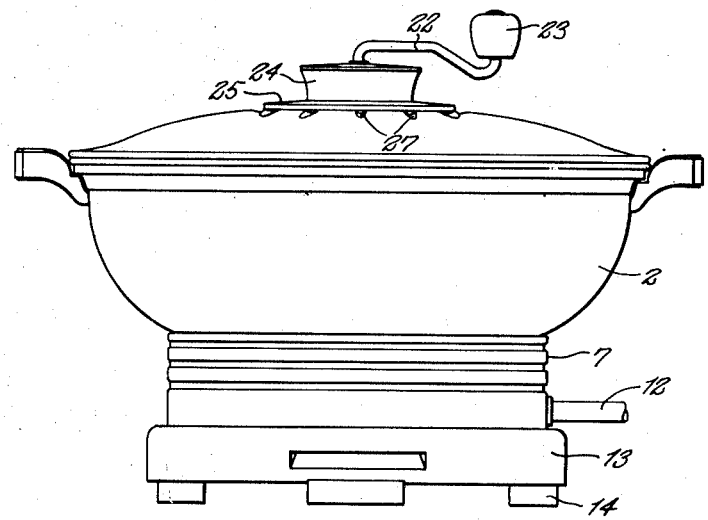
Figure 5:
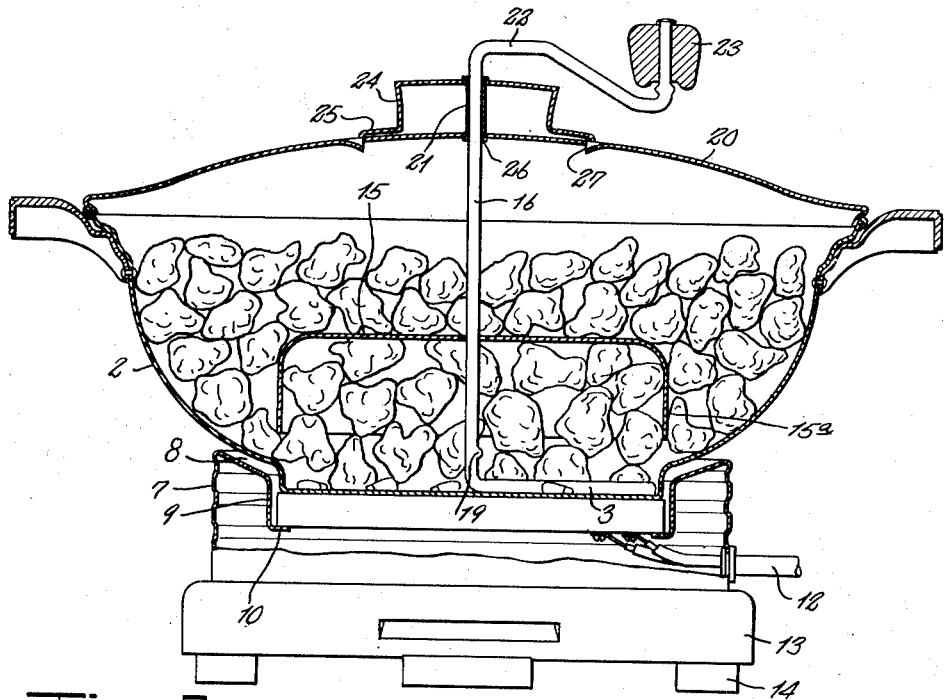
Figure 6:
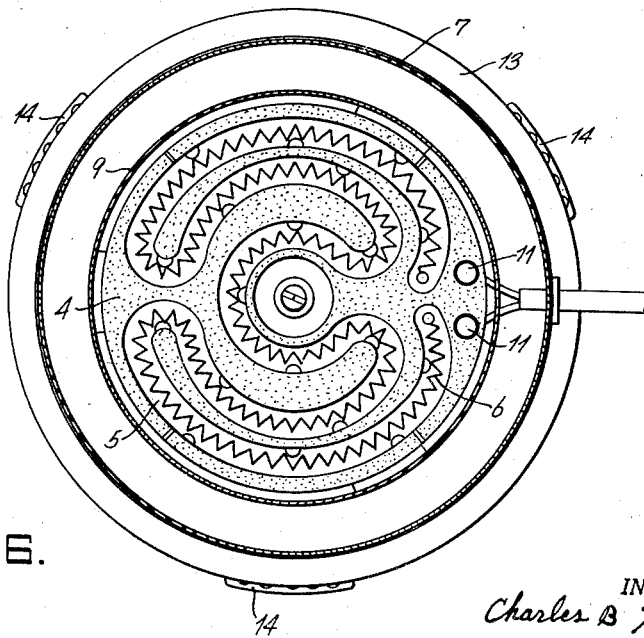

The accompanying drawings illustrate a popcorn popping device of the general type mentioned and embodying the principles of the present invention in what is at present believed to be the best form. In these drawings the various figures are as follows:

Fig. 1 is a top view of the device with the lid on;
Fig. 2 is a side view of Fig. 1;
Fig. 3 is a vertical cross section taken from the line 3—3 in Fig. 1;
Fig. 4 is a horizontal cross section taken from the line 4—4 in Fig. 3;
Fig. 5 is the same as Fig. 3 but shows the operation of the device while the corn is popping; and
Fig. 6 is a horizontal cross section taken from the line 6—6 in Fig. 3.

The pot of the illustrated device has a central sump 1, adapted for heating, and a side wall 2 flaring upwardly therefrom. The sump 1 is made in the form of a cylindrical depression arranged concentrically with the pot's vertical center line, and the wall 2 symmetrically flares, from the top periphery of the sump, in an outwardly rounded manner. It is considered desirable to have the wall 2 closely approaching tangency respecting the sump's upper periphery. The stirrer 3 is arranged to work over the bottom of the sump 1, this bottom being in the form of a flat disk. Preferably all parts of the pot are drawn from a single piece of sheet metal so they are integral.

When popcorn kernels are placed in the pot they naturally fall to the bottom of the sump 1. When this sump is heated sufficiently the kernels pop and, in view of their resulting increase in volume, tend to ride upwardly away from the sump 1 by wedging action against the side wall 2. When this side wall meets the upper periphery of the sump in a manner approaching tangency, the popped popcorn gets an easier start away from the sump 1.

It follows that when the bottom of the sump 1 is heated for a long time, in attempts to pop kernels that are resisting popping, there is less than the usual chance of scorching the popped popcorn. This follows from the tendency of the popped popcorn to ride away from the hot bottom of the sump 1. While the popped popcorn tends to wedge itself away from the sump bottom, the unpopped kernels tend to remain on the heated sump bottom. If thrown away by the force of popping kernels, the unpopped kernels tend to return to the sump bottom. The stirrer 3 may be used in the usual manner during the popping process.

If the described and illustrated pot is used over an open flame, there is the chance that the curved side wall 2 might be heated so hot that the popped popcorn will be scorched. Therefore, the invention also embraces the combination of this pot with a stove providing a refractory disk 4 having a labyrinth-like top recess 5 in which an electrical resistance heating coil 6 is positioned. This coil may be made from nickel-chromium wire such as is usually used for electric resistance heating elements which must operate in the open air.

Now, as is illustrated, the diameter of the refractory disk 4 should just about exactly equal the diameter of the flat bottom of the cylindrical sump 1. The refractory disk is more or less uniformly heated by conduction and radiation from the coil 6, and this disk provides a heated area confined to the limits of the sump bottom. The coil 6 is positively confined to these limits also. Therefore, the pot's side wall 2 is mainly heated only by heat conducted through it from the sump 1. Only the sump's bottom is heated directly, with this combination. This arrangement provides the result of even more positively preventing scorching of the popped popcorn wedged away from the sump's bottom. This result is obtained regardless of prolonged heating of the unpopped popcorn concentrated in the sump 1. This provides a chance for popping all the popcorn kernels without scorching the popped popcorn.

As illustrated, the refractory disk 4 is supported by a stove shell having a generally cylindrical, vertical wall 7 with its top provided with an inwardly and downwardly depending flange 8 from the inner periphery of which hangs an inner cylindrical wall 9 of substantially greater inside diameter than the outside diameter of the sump 1 and the disk 4. The bottom end of this wall 9 has an inwardly extending flange 10 on which the refractory disk 4 rests. The disk 4 may be secured relatively loosely to the flange 10, in any convenient fashion, due attention being paid to the necessary allowance for thermal expansion and contraction of the disk 4. The ends of the heating coil 6 may be fixed to terminal screws 11 which extend downwardly through the disk 4 with their lower ends exposed and fastened to the ends of a multiple-conductor electric cord 12. The cylindrical outer shell 7 is shown apertured and bushed, with this cord 12 extending through the bushing. The cylindrical outer shell 7 is shown supported by a base 13 having legs 14 for holding the base high enough to prevent direct heat conduction from it to the table or whatever the device is placed upon. These legs 14 may be made of a non-metallic material to reduce the heat conduction through them.

Preferably the shell 7 and its parts 8, 9 and 10 are all drawn from a single metal sheet so these parts are integral. Therefore, the parts 8, 9 and 10 can conduct some of the heat from the refractory disk 4 to locations opposite but spaced slightly from the bottom portion of the wall 2 of the pot. This means that some of the heat may be radiated to the bottom portion of the wall 2 to more uniformly heat it without, at the same time, involving any risk of heating the wall 2 so hot as to possibly involve scorching of popcorn contacting it.

It is to be noted that although the heating part of the device itself provides a handy hot plate or stove, that it is particularly designed to work in combination with the pot in the manner previously described. Attempts to substitute other heating means, which might not restrict the heating to the bottom of the sump 1, may not provide the same result.

A further and important improvement is effected, in the case of the illustrated popper, by providing the top of the sump 1 with a closure 15 which is vertically reciprocative and downwardly biased with a force permitting its upward displacement by the expanding force of the popping corn. In the illustrated instance this force bias is provided by the weight of the closure, the force obtained being effected by proper proportioning of the closure's weight. This closure provides the result of functioning as a check valve permitting escape of popped corn from the sump 1 while confining the unpopped corn kernels therein. Thus, when the popping force throws the unpopped kernels about, the closure 15 tends to confine the unpopped kernels to the bottom of the sump 1. Also as the popping popcorn lifts the closure 15, so that the popped popcorn can escape and wedge itself up the pot's side wall 2, the popped popcorn tends to ride back on top of the closure 15 so the popped popcorn cannot get back to the sump 1 where it might be scorched during prolonged heating.

The closure 15 is illustrated as being in the form of a flat, circular disk which, connected therewith through a downwardly rounded periphery, has a depending skirt 15a for restraining more positively the unpopped popcorn from escaping from the sump 1 when thrown about by popping popcorn therein. Preferably the closure parts are all integral with the closure formed by drawing it from a single piece of sheet metal.

The stirrer 3 is of the rotating arm type and has an operating shaft 16 extending upwardly from the sump 1 on the vertical center line of the pot. The closure 15 is provided with a hole 17 through which the shaft 16 passes so as to function as a guide for the closure. The hole 17 is sufficiently larger in diameter than is the shaft 16 to assure a relatively loose fit. That is to say, the closure 15 must be able to ride and fall freely with its weight biasing it downwardly or to sump closing position. The force bias supplied the closure 15 should not be so great as to prevent the closure rising when it receives the force of the expanding popcorn.

The stirrer 3 is in the form of a right angularly extending arm working over the sump's bottom when the shaft 16 is rotated, and the hole 17 is made sufficiently large to permit the closure 15 to pass down over the shaft 16 and turn and pass over the right angularly extending arm of the stirrer. This permits easy disassembly for cleaning purposes. The hole 17 is provided with a radially extending slot 18, and the shaft 16 has a radially extending projection 19, near its bottom, preventing passage of the closure 15 excepting when the projection 19 is registered with the slot 18. It follows that the cover 15 may be picked up by simply lifting up on the shaft 16, yet the mentioned disassembly is possible by deliberate registration of the slot 18 and projection 19.

The device further includes a lid 20 for closing the pot by resting on the upper periphery of its outwardly flared or curved wall 2. The shaft 16 is journaled by a bearing 21 built into this lid 20 at its center, and the top of the shaft 16 is provided with a right angular extending, manually operable crank 22 provided with a rotative knob 23 for easing its operation. Preferably the stirrer 3, its shaft 16 and the crank 22 are all one piece of suitably bent wire.

With the bearing 21 supporting the shaft 16, as described, it follows that the shaft 16 is journaled by and depends from the lid 20. Therefore, simply by lifting up the lid 20, the stirrer and the closure 15 all come out of the pot together. The bearing 21 is illustrated as a relatively long, vertical cylinder or tube supported by an inverted cup 24 with the bottom of the latter's wall provided with an outwardly and downwardly extending flange 25. Assembly is effected by the cylinder bearing 21 having flanged ends 26 which clamp the cup to the top of the lid 20. Vents are provided by punching the lid 21 inwardly and downwardly to provide inwardly and downwardly directed openings 27 which are partly within and partly outside of the outer periphery of the flange 25. Therefore, condensate, formed by the popped popcorn, has little tendency to escape so as to wet the outside or top of the lid 20. Instead, the condensate tends to form on the upwardly slanting walls of the openings 27 and then run back into the pot.

It is to be noted that any corn popper provided with a lid has the tendency for condensate to form on the inside of this lid during the popping of the corn. Popped popcorn can absorb condensate dropping from the inside of the lid without material harm, and some persons think the popcorn is improved due to the fact that it is slightly moistened and therefore steaming somewhat when ready for use. However, when water falls on unpopped popcorn kernels it has a tendency to interfere with the popping process. It is generally well known that wet popcorn does not pop very well. The closure 15 comes to the aid of this situation in that it positively prevents any condensate from getting on unpopped popcorn in the bottom of the sump 1. Thus it can be seen that not only does the cover 15 provide all the other results described, but this additional one as well.

I claim:

1. In a popcorn popper including a pot having a shallow sump for containing the unpopped corn and a deep side wall flaring upwardly therefrom at a slant wedging the popped corn upwardly from the sump, the combination with said pot of an upwardly opening check valve for the top opening of said sump and which is constructed and arranged to pass upwardly the popped corn from said sump and to retard the popped corn from falling back into the sump, said valve being in the form of a vertically reciprocative horizontal plate having a peripherally depending skirt fitting the opening of said sump, and a lid fitting the top opening of said pot and having a rod depending therefrom and passing through a hole in said horizontal plate with the latter thus reciprocatively mounted by said rod, the latter having means below said plate, when the latter's skirt is fitted with said sump's opening and said lid is fitted with said pot's opening, which means prevents said plate from slipping off of said rod when the lid is lifted.

2. In a popcorn popper including a pot having a shallow sump for containing the unpopped corn and a deep side wall flaring upwardly therefrom at a slant wedging the popped corn upwardly from the sump, the combination with said pot of an upwardly opening check valve for the top opening of said sump and which is constructed and arranged to pass upwardly the popped corn from said sump and to retard the popped corn from falling back into the sump, said valve being in the form of a vertically reciprocative horizontal plate having a peripherally depending skirt fitting the top opening of said sump, and a lid fitting the top opening of said pot and having a rod depending therefrom and passing through a hole in said horizontal plate with the latter thus reciprocatively mounted by said rod, the latter having means below said plate, when the latter's skirt is fitted with said sump's opening and said lid is fitted with said pot's opening, which means prevents said plate from slipping off of said rod when the lid is lifted, said plate and said skirt being imperforate, excepting for said hole, and forming a condensate shield over said sump.

3. A popcorn popper including a heating surface, a popcorn container having a bottom adjacently positioned over said surface and surrounded by a side wall that flares upwardly away therefrom in all transverse directions, a cup-like member having a rim shaped to substantially register with the periphery of said surface, and means for positioning said member over and downwardly facing said bottom with said rim registered with said periphery and vertically movable freely between positions respectively permitting and preventing the passage of popped popcorn between said rim and the inside of said container.

4. A popcorn popper including a heating surface, a popcorn container having a bottom adjacently positioned over said surface and surrounded by a side wall that flares upwardly away therefrom in all transverse directions, a cup-like member having a rim shaped to substantially register with the periphery of said surface, and means for positioning said member over and downwardly facing said bottom with said rim registered with said periphery and vertically movable freely between positions respectively permitting and preventing the passage of popped popcorn between said rim and the inside of said container, said means comprising a vertical shaft depending above said bottom, said member having a central hole through which said shaft projects with a sliding fit, and a cover resting on the top of said container and through which said shaft is rotatively journaled, and an arm projecting laterally from the bottom of said shaft and positioned to stir popcorn beneath said member on said bottom.

CHARLES B. HOBBS.

REFERENCES CITED

The following references are of record in the file of this patent:

UNITED STATES PATENTS

| Number | Name | Date |
| --- | --- | --- |
| 909,054 | Bland | Jan. 6, 1909 |
| 1,808,758 | Bettandorff | June 9, 1931 |
| 2,194,852 | Gundelfinger et al. | Mar. 26, 1940 |
| 2,441,941 | Shafter | May 18, 1948 |